April 2, 1968
J. M. DELI ET AL
3,376,081
DUAL SEALED TRACK JOINT
Filed Jan. 3, 1966
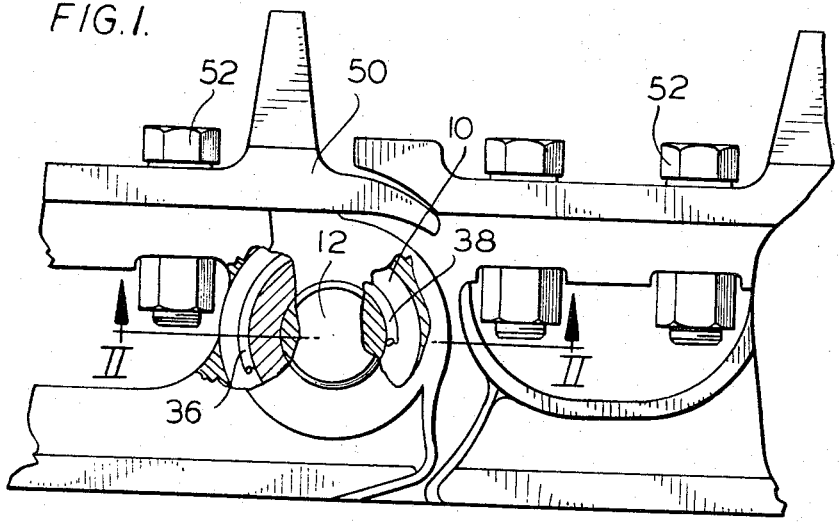
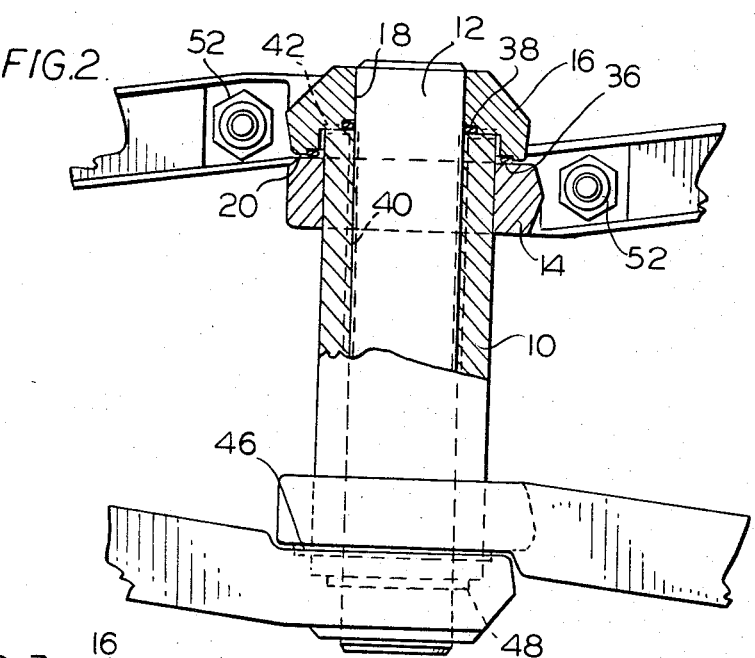
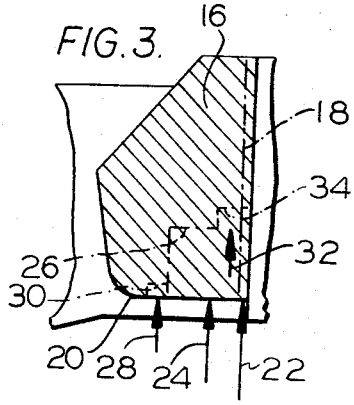
INVENTORS
JACK M. DELI
PAUL F. PLOMB
John W. Gaines
ATT'Y United States Patent Office 3,376,081
Patented Apr. 2, 1968

3,376,081
DUAL SEALED TRACK JOINT
Jack M. Deli, Wheaton, and Paul F. Plomb, Elmhurst, Ill., assignors to International Harvester Company, Chicago, Ill., a corporation of New Jersey
Filed Jan. 3, 1966, Ser. No. 518,437
8 Claims. (Cl. 305—11)

ABSTRACT OF THE DISCLOSURE

Dual sealed track joint providing the environment of a bushing counterbore and a track link bushing having a thrust end projecting into the counterbore in an outer circumferential ring of pressure contact or face contact with the base of the counterbore. The seals seal the ring of pressure contact from both sides, with an outer one of the dual seals being of large diameter and sealing off the ring of contact from outside contaminant, and the other seal being of small diameter and forming an inner seal between the base of the counterbore and the inner circumferential face portion of the thrust end of the bushing.

---

This invention relates to a dual sealed pin and bushing type track joint construction in which the seals are located at respective circumferential inner and circumferential outer positions relative to the radially disposed, thrust transmitting end of the bushing.

According to practice in the past, a re-bore has sometimes been formed in the mutual vicinity of the bushing and outer link of a two-link, track joint to provide a seal recess. But where to precisely locate that re-bore has been a problem, particularly if the outer one of the links has been of the bushing counterbore type adapted to have the thrust end of the bushing project for a major portion thereinto so as to offset the radial end face of the bushing from the plane between the links. As a consequence, the thrust end has been neglected and, unfortunately it has been the practice simply to replace the outer link each time the counterbore becomes unsound from extended dry or abrasive wear aggravated due to the thrust.

The present invention materially reduces or substantially eliminates the foregoing problem, as will now be explained. Features, objects and advantages will either be specifically pointed out or become apparent when, for a better understanding of the invention, reference is made to the following description taken in conjunction with the accompanying drawing which shows a preferred embodiment thereof and in which:

FIGURES 1 and 2 are side elevational and top plan views, with parts partially broken away for clarity, showing a track link joint embodying the present invention; and FIGURE 3 is an enlargement of a detail part in FIGURE 2, illustrating a sequence in the manufacture.

In the dual sealed track joint construction as shown in FIGURES 1, 2, and 3 of the drawing, a bushing 10 has a track pin 12 rotatably received therein. At one end, an inner link portion 14 embraces that end of the bushing 10. A bored outer link 16, which embraces a corresponding end of the pin 12, has a bore 18 in which the pin is received, and has an inner face 20 which mutually confronts the inner link portion with a space of between 0.000 and 0.030 inch therebetween. The links are steel forgings.

A rotary tool, not shown, is introduced in the direction of the arrow 22 (FIGURE 3) so as to remove the material and form the finished bore 18. A re-bore indicated by the arrow 24 forms the circumferential wall and radially inwardly extending floor of a counterbore 26 receiving and confronted by the adjacent end of the bushing 10. A re-bore indicated by the arrow 28 intersects the inner face 20 and the wall of the counterbore 26 so as to form an O-ring groove 30. A re-bore indicated by the arrow 32 intersects the bore 18 and the floor of the counterbore 26 to form an O-ring groove 34.

The re-boring can be performed in any individual order of steps preferred, or else two of the re-bores 26, 30, and 34, can be formed or all three can be formed simultaneously.

Separated dual seals of differing diameter are provided, the large diameter seal 36 being within and engaging the groove 30, and engaging the confronting inner link portion 14 and the bushing 10 to exclude contaminant from between the counterbore 26 and the thrust end of the confronting bushing. The small diameter seal 38 is within and engages the groove 34, and engages the radial end surface of the confronting bushing and the circumferential surface of the pin 12 to exclude contaminant from between the pin and bushing. In these statements resides a brief summary of our invention.

The foregoing joint is sealed and lubricated for life at the factory. The small diameter seal 38 seals in the lubricant to minimize wear along a vulnerable interface of contact 40 on which the bushing and pin relatively turn during track movement. The seal 36 seals in the lubricant along a thrust interface 42 on which the bushing and the counterbore 26 relatively turn during track movement. While it is true that wear is inevitable along the interface 40 because of large track tension forces and the snaking action of the track, wear at the interface 42 is kept at a minimum by the sealing. Hence, the outer link 16 of each joint has a sound counterbore, and can be reused when the pin and bushing 10 and 12 have worn at 40 to the point that replacement is necessary.

Plural seals 46 and 48 similar to the seals 36 and 38 are received at the opposite end of the bushing and pin in similar O-ring grooves in an outer link at the end. The seals are preferably O-rings which are stretched about the respective bushing and pin and which distort into essentially elliptical shape in cross section when under their normal load. They are made of an especially abrasive resistant material such as the carboxylated material which is a readily available elastomer used commercially for O-rings.

Our sealed joint is primarily adapted for use in crawler vehicles in the endless track assemblies, in which the links form a chain at each side to which grouser carrying track plates 50 are secured by bolts 52. The endless chain and track plates are conventional in that respect, the crawler track construction and operation being generally known as shown in expired Patent No. 2,376,864. All joints in the endless track are dual sealed at each end in the same way, except possibly for the master pin, not shown.

The language herein calling for embracing of one part of a pair by the other part, is in reference to using a press assembly in which an interference fit between the pair of parts prevents relative rotation and endwise shift of the embraced part. Contaminant has reference to silt, dirt, and other abrasion-causing foreign matter.

What is claimed is:

1. In an endless track, chain, or the like having a bushing and pin joint:
   the combination with the bushing and a companion pin received therein, of an inner link portion embracing one end of the bushing;
   a bored outer link embracing a corresponding end of the pin, and having a bore in which the pin is received and having an inner face in mutually confronting relation with the inner link portion;
   a re-bore in said outer link between the bore and inner face, forming a bushing counterbore receiving and in face contact along an interface of pressure engagement with the thrust end of the bushing:

a second re-bore intersecting the inner face of the outer link and the wall of the counterbore;

a seal within and engaging the second re-bore, and en-engaging the confronting inner link portion and the bushing, to exclude contaminant from between the counterbore and the confronting bushing;

a third re-bore (34) intersecting the bore and the floor of the counterbore; and a seal within and engaging the third re-bore, and engaging the confronting bushing and pin, to exclude contaminant from between the pin and the bushing.

2. The invention of claim 1, the combination characterized by:

said plural seals comprising O-rings, said second and third re-bores forming separate O-ring grooves receiving different ones of such O-rings; and similar grooves in an outer link and similar plural O-rings therein, at the opposite end of the bushing and pin.

3. The invention of claim 2, the combination characterized by:

each O-ring of the plural O-rings at an end of the bushing and pin being of a differing diameter from the other O-ring at that end; each such large diameter O-ring being stretched around, and held by its tension to seat against, the bushing, and each small diameter O-ring being stretched around, and held by its tension to seat against, the pin.

4. The invention of claim 3, and including:

sealed-in lubricant on the interface presented by the bushing and pin, and sealed therebetween by the small rings disposed one at each end, and on the interface presented by the bushing and the confronting counterbore at each end and sealed therebetween by the plural rings at that end.

5. The invention of claim 2, the combination characterized by:

the inner link portion and the confronting inner face of the bored outer link at each end of the pin and bushing defining a mutual gap in the approximate range between 0.000 and 0.030 inch, each O-ring seal within the adjacent second re-bore bridging such gap so as to effect engagement with the confronting inner link portion in the manner described.

6. The invention of claim 2, characterized wherein:

the O-rings are a carboxylated elastomer.

7. The joint construction as claimed in claim 2, and being included in, and forming no fewer than a majority of all the joints of, an endless crawler track assembly.

8. The invention of claim 7, with the crawler track assembly characterized by grouser carrying track plates, and characterized wherein each of the outer links and inner link portions are steel forgings forming a chain to which the track plates are detachably secured.

References Cited

UNITED STATES PATENTS

| | | | |
|---|---|---|---|
| 1,289,408 | 12/1918 | Davis | 305—11 |
| 2,376,864 | 5/1945 | Eberhard | 305—11 |
| 3,110,524 | 11/1963 | Zeller | 305—11 |
| 3,143,377 | 8/1964 | Bulgrin | 301—63 |
| 3,206,258 | 9/1965 | Heinrich | 305—11 |
| 3,244,457 | 4/1966 | Ross | 305—11 |

RICHARD J. JOHNSON, *Primary Examiner.*

BENJAMIN HERSH, *Examiner.*

UNITED STATES PATENT OFFICE
CERTIFICATE OF CORRECTION

Patent No. 3,376,081                      April 2, 1968

Jack M. Deli et al.

It is certified that error appears in the above identified patent and that said Letters Patent are hereby corrected as shown below:

Column 1, line 13, "thrust and" should read -- thrust end --.

Signed and sealed this 14th day of October 1969.

(SEAL)
Attest:

Edward M. Fletcher, Jr.

Attesting Officer

WILLIAM E. SCHUYLER, JR.

Commissioner of Patents